United States Patent
Nagasawa

(10) Patent No.: US 10,899,303 B2
(45) Date of Patent: Jan. 26, 2021

(54) PASSENGER PROTECTION APPARATUS FOR VEHICLE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 22 days.

(21) Appl. No.: 15/872,292

(22) Filed: Jan. 16, 2018

(65) Prior Publication Data

US 2018/0281730 A1    Oct. 4, 2018

(30) Foreign Application Priority Data

Mar. 31, 2017  (JP) ................. 2017-070876

(51) Int. Cl.
*B60R 21/207*   (2006.01)
*B60N 2/75*    (2018.01)
*B60R 21/26*   (2011.01)
*B60R 21/013*  (2006.01)
*B60R 21/239*  (2006.01)
*B60R 21/0134* (2006.01)
*B60R 21/0136* (2006.01)
(Continued)

(52) U.S. Cl.
CPC .............. *B60R 21/207* (2013.01); *B60N 2/75* (2018.02); *B60N 2/79* (2018.02); *B60R 21/013* (2013.01); *B60R 21/0134* (2013.01); *B60R 21/0136* (2013.01); *B60R 21/239* (2013.01); *B60R 21/26* (2013.01); *B60R 2021/0032* (2013.01); *B60R 2021/01211* (2013.01)

(58) Field of Classification Search
CPC ....................................................... B60N 2/79
See application file for complete search history.

(56) References Cited

U.S. PATENT DOCUMENTS 5,564,736 A * 10/1996 Kim ................. B60R 21/02
                                                  280/730.2
5,678,852 A * 10/1997 Brown ............. B60R 21/207
                                                  280/730.2
(Continued)

FOREIGN PATENT DOCUMENTS

JP    2003-312341 A    11/2003
JP    2005-125944 A     5/2005
(Continued)

OTHER PUBLICATIONS

Office Action received in Japanese Patent Application No. 2017-070876 dated Nov. 20, 2018 (3 pages in Japanese with English translation).

*Primary Examiner* — Nicole T Verley
(74) *Attorney, Agent, or Firm* — Smith, Gambrell & Russell, LLP

(57) ABSTRACT

A passenger protection apparatus for a vehicle includes an armrest, a movable member, and a controller. The armrest is provided on a side of a seat in a vehicle on which an arm of a passenger sitting on the seat can be placed. The movable member is provided in the armrest, and configured to move from the armrest toward a side of an upper body of the passenger sitting on the seat and retract into the armrest. The controller is configured to move and retract the movable member in accordance with a behavior of the vehicle.

20 Claims, 12 Drawing Sheets

(51) Int. Cl.
*B60R 21/00* (2006.01)
*B60R 21/01* (2006.01)

(56) References Cited

U.S. PATENT DOCUMENTS

| | | | | |
|---|---|---|---|---|
| 5,746,443 | A * | 5/1998 | Townsend | B60J 5/06 |
| | | | | 280/730.2 |
| 5,911,434 | A * | 6/1999 | Townsend | B60J 5/06 |
| | | | | 280/730.2 |
| 5,925,084 | A | 7/1999 | Gotoh et al. | |
| 7,802,809 | B2 * | 9/2010 | Ryan | B60R 21/207 |
| | | | | 280/730.1 |
| 8,042,866 | B2 * | 10/2011 | Kling | B60R 22/20 |
| | | | | 280/801.1 |
| 8,322,747 | B2 * | 12/2012 | Shankar | B60R 21/23138 |
| | | | | 280/729 |
| 8,469,394 | B2 * | 6/2013 | Schuller | B60R 21/239 |
| | | | | 280/730.2 |
| 8,616,579 | B2 * | 12/2013 | Suzuki | B60R 21/2338 |
| | | | | 280/743.2 |
| 8,740,244 | B2 * | 6/2014 | Obadia | B60R 21/18 |
| | | | | 280/730.2 |
| 9,434,340 | B2 * | 9/2016 | Egusa | B60R 7/04 |
| 9,463,763 | B2 | 10/2016 | Watamori et al. | |
| 9,511,741 | B1 * | 12/2016 | Wu | B60R 21/36 |
| 9,533,697 | B2 * | 1/2017 | Avetian | B61B 13/10 |
| 9,566,882 | B2 * | 2/2017 | Mihm | B60R 21/231 |
| 9,573,497 | B2 * | 2/2017 | Jaradi | B60N 2/4207 |
| 9,616,747 | B1 * | 4/2017 | Breed | B60K 31/0058 |
| 9,783,155 | B2 * | 10/2017 | Kondo | B60N 2/79 |
| 9,788,588 | B2 * | 10/2017 | Allen | A41D 13/018 |
| 10,232,815 | B1 * | 3/2019 | Dry | B60R 21/18 |
| 10,308,212 | B2 * | 6/2019 | Wu | B60R 19/205 |
| 10,343,644 | B2 * | 7/2019 | Dry | B60N 2/753 |
| 2014/0007761 | A1 * | 1/2014 | Haidar | F41H 7/042 |
| | | | | 89/36.02 |
| 2016/0039385 | A1 | 2/2016 | Watamori et al. | |
| 2016/0052477 | A1 * | 2/2016 | Tobata | B60R 21/207 |
| | | | | 280/730.1 |
| 2016/0052636 | A1 * | 2/2016 | Moeller | B64D 25/02 |
| | | | | 244/121 |
| 2019/0152355 | A1 * | 5/2019 | Mizuno | B60N 2/26 |

FOREIGN PATENT DOCUMENTS

| | | | |
|---|---|---|---|
| JP | 2007-204046 A | | 8/2007 |
| JP | 2007204024 A | * | 8/2007 |
| JP | 2009-056836 A | | 3/2009 |
| JP | 2016-037134 A | | 3/2016 |
| JP | 2018171997 A | * | 11/2018 |

* cited by examiner

PASSENGER PROTECTION APPARATUS FOR VEHICLE

CROSS-REFERENCE TO RELATED APPLICATIONS

The present application claims priority from Japanese Patent Application No. 2017-070876 filed on Mar. 31, 2017, the entire contents of which are hereby incorporated by reference.

BACKGROUND

1. Technical Field

The present invention relates to a passenger protection apparatus for a vehicle such as an automobile.

2. Related Art

An airbag such as a front airbag for an automobile is deployed around a passenger, and the passenger slumps against the front airbag, so that the front airbag can absorb an impact on the passenger in a collision, which is disclosed, for example, in Japanese Unexamined Patent Application Publication No. 2016-037134.

Here, this front airbag deployed in front of the seat needs to be widely deployed basically from front to back, specifically, from an interior member disposed around the seat toward the passenger sitting on the seat. In this state, the front airbag widely deployed is required to absorb the weight of the passenger. Therefore, an inflator used in the front airbag is required to instantly generate a great amount of high-pressure gas. In addition, it takes a time from when the front airbag starts deploying until the front airbag has deployed enough to absorb the weight, although the time is only a moment. Thus, this airbag configured to deploy from the interior member disposed around the seat toward the passenger sitting on the seat basically cannot provide a good balance between the volume of deployment and the effect produced thereby. Moreover, this balance may become worse when the size of the airbag such as the width is increased to receive the passenger by the airbag in various types of collisions, and when the speed of deploying the airbag is increased to improve the instantaneity.

Furthermore, the posture of the passenger sitting on the seat of the vehicle may be different from the posture which was expected at the time of manufacturing the vehicle. Furthermore, when the vehicle sharply turns, the upper body of the passenger sitting on the seat is likely to be shaken back and forth and from side to side. In particular, if automatic driving becomes common in the future, the upper body of the passenger sitting on the seat is likely to be badly shaken by an unexpected vehicle behavior. Then, for example, when the vehicle is in a collision while the upper body of the passenger is shaken from side to side, there is a risk that the front airbag cannot appropriately receive the upper body of the passenger slumping against the airbag from the side position.

SUMMARY OF THE INVENTION

It is desirable to provide a passenger protection apparatus capable of improving passenger protection performance not only in a collision.

An aspect of the present invention provides a passenger protection apparatus for a vehicle including an armrest, a movable member and a controller. The armrest is provided on a side of a seat in a vehicle on which an arm of a passenger sitting on the seat can be placed. The movable member is provided in the armrest and configured to move from the armrest toward a side of an upper body of the passenger sitting on the seat and retract into the armrest. The controller is configured to move and retract the movable member in accordance with a behavior of the vehicle.

DETAILED DESCRIPTION

Hereinafter, examples of the present invention will be described with reference to the drawings.

Example 1

Figure 1:
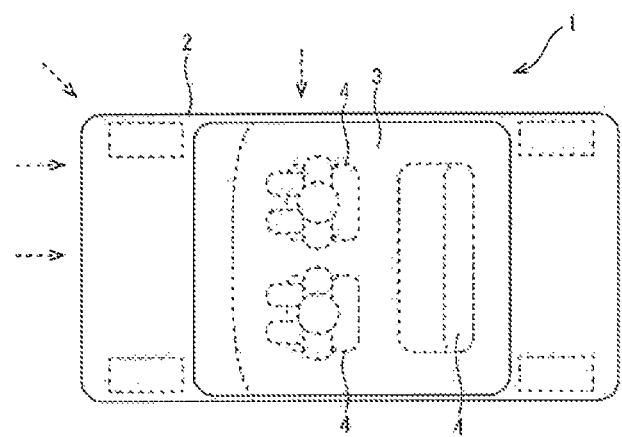
FIG. 1 illustrates an automobile to which a passenger protection apparatus according to examples of the present invention is applicable.

FIG. 1 illustrates an automobile 1 to which a passenger protection apparatus 10 according to examples of the present invention is applicable. FIG. 1 illustrates the automobile 1 viewed from above. The automobile 1 is an example of vehicle. The automobile 1 illustrated in FIG. 1 includes an automobile body 2. A plurality of seats 4 on which passengers sit are disposed in a passenger compartment 3 in the automobile body 2, A handle, an accelerator pedal, and a brake pedal (not illustrated) are disposed in front of the right front seat 4. The automobile 1 moves forward, stops, moves backward, turns right, and turns left by operating the handle and so forth by a passenger sitting on the seat 4.

While moving, the automobile 1 may collide with another automobile and so forth. The impact in the collision may be inputted to, for example, the front and the side of the automobile body 2. Here, there are several types of collisions on the front of the automobile body 2: a full-wrap collision where the impact is inputted to the center of the front; an offset collision where the impact is inputted to a position offset from the center of the front; and an oblique collision where the impact is obliquely inputted to the front.

In order to address these various types of collisions, the automobile 1 is equipped with various airbag devices as well as a seat belt device 14.

Figure 2:
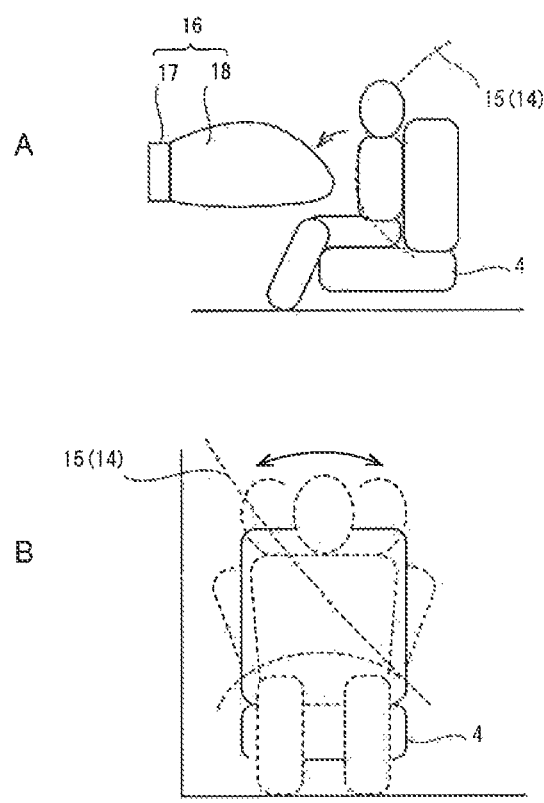
FIG. 2 illustrates functions of a front airbag to protect the passenger.

FIG. 2 illustrates functions of a front airbag 18 to protect the passenger. A seat belt 15 extends across the front body of the passenger sitting on the seat 4 in FIG. 2A. The front airbag 18 is deployed in front of the seat 4. In this case, the passenger sitting on the seat 4 is fastened by the seat belt 15, and the upper body of the passenger sitting on the seat 4 bends forward. The upper body bent forward slumps against the deployed front airbag 18. By this means, the front airbag 18 can absorb the impact on the passenger in the collision.

However, for example, the front airbag 18 in front of the seat 4 needs to be widely deployed, basically from front to back, specifically, from an interior member disposed around the seat 4 toward the passenger sitting on the seat 4. In this state, the airbag 18 widely deployed is required to absorb the weight of the passenger. Therefore, an inflator used in the front airbag 18 is required to instantly generate a great amount of high-pressure gas. Moreover, it takes a time from when the front airbag 18 starts deploying until the front airbag 18 has deployed enough to absorb the weight, although the time is only a moment. Thus, this front airbag 18 configured to deploy from the interior member disposed around the seat 4 toward the passenger sitting on the seat 4 basically cannot provide a good balance between the volume of deployment and the effect produced thereby. Moreover, this balance may become worse when the size of the airbag such as the width is increased to receive the passenger slumping against the front airbag 18 in various types of collisions, and when the speed of deploying the airbag is increased to improve the instantaneity.

Furthermore, the posture of the passenger sitting on the seat 4 of the automobile 1 may be different from the posture which was expected at the time of manufacturing the automobile 1. Furthermore, when the automobile 1 sharply turns, the upper body of the passenger sitting on the seat 4 is likely to be shaken back and forth and from side to side, as illustrated in FIG. 2B. In particular, if automatic driving becomes common in the future, the upper body of the passenger sitting on the seat 4 is likely be badly shaken by an unexpected vehicle behavior. Then, for example, when the automobile 1 is in a collision while the passenger is shaken from side to side, there is a risk that the front airbag 18 cannot appropriately receive the upper body of the passenger slumping against the airbag from the side position.

As described above, the passenger protection apparatus is required to improve the passenger protection performance.

Figure 3:
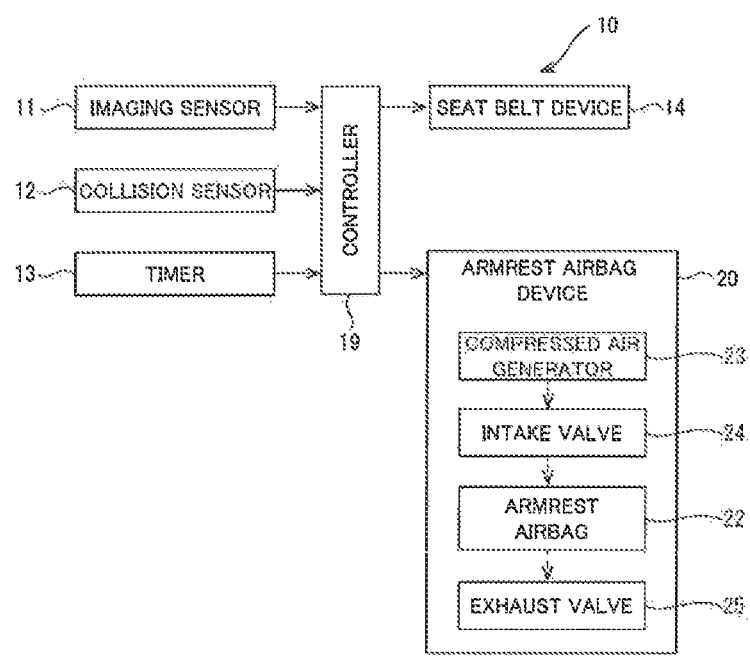
FIG. 3 is a block diagram illustrating the passenger protection apparatus according to the present invention.

FIG. 3 is a block diagram illustrating the passenger protection apparatus 10 according to the example of the present invention. In FIG. 3, the passenger protection apparatus 10 includes an imaging sensor 11, a collision sensor 12, a timer 13, the seat belt device 14, an armrest airbag device 20, and a controller 19 to which these components are coupled.

For example, the imaging sensor 11 is disposed to face forward inside the windshield of the automobile body 2, and captures images outside and in front of the automobile 1. For example, the collision sensor 12 is an acceleration sensor attached to the automobile body 2, and detects the impact on the automobile body 2 in a collision. The timer 13 measures time. The seat belt device 14 includes a seat belt 15 and a retractor (not illustrated). The seat belt 15 extends across the front body of the passenger sitting on the seat 4. The retractor is provided, for example, in a B pillar of the automobile body 2 and reels the seat belt 15.

Figure 4:
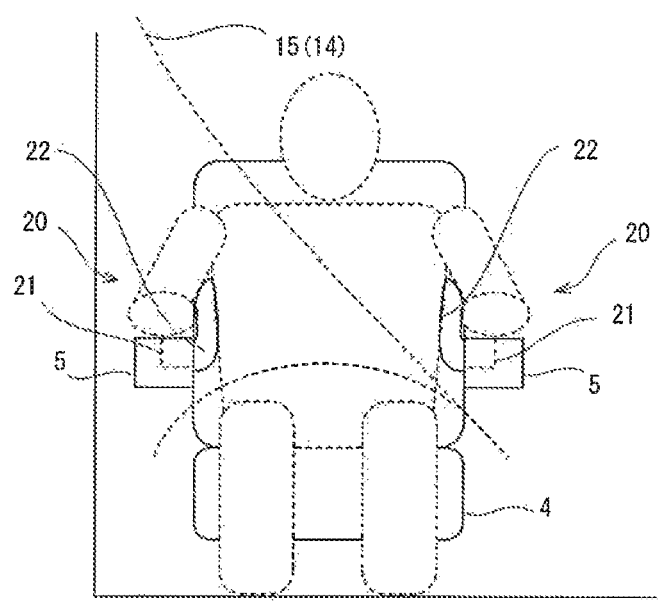
FIG. 4 is a front view illustrating the structure of armrest airbag devices according to Example 1.
Figure 5:
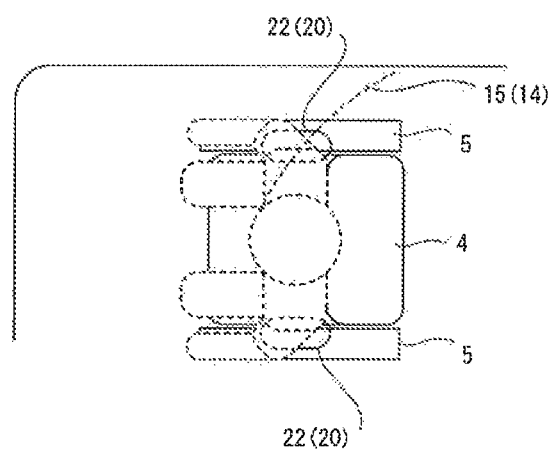
FIG. 5 is a plan view illustrating the structure of the armrest airbag devices illustrated in FIG. 4.
Figure 6:
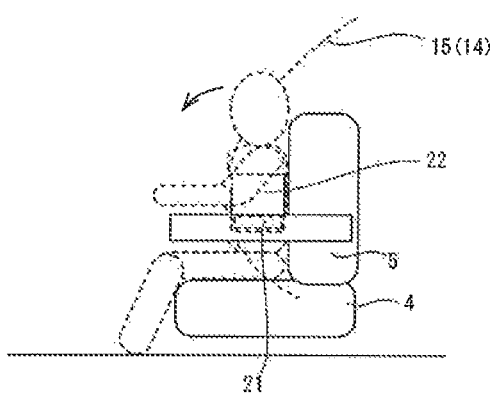
FIG. 6 is a side view illustrating the structure of the armrest airbag device illustrated in FIG. 4.

FIGS. 4 to 6 illustrate the structure of the armrest airbag devices 20 according to Example 1. FIG. 4 is a front view as viewed from the front of the automobile body 2, FIG. 5 is a plan view as viewed from the top of the automobile body 2, and FIG. 6 is a side view as viewed from the left side of the automobile body 2. As illustrated in FIGS. 4 to 6, a pair of right and left armrests 5 is mounted to the right and left sides of a backrest of the seat 4, respectively. Here, the armrests 5 may be provided anywhere as long as the armrests 5 are disposed on the right and left sides of the seat 4. For example, the armrests 5 may be formed in door panels as the interior members located on the right and left sides of the seat 4, or formed in a center console. Each of the armrests 5 extends along the front-to-back direction of the automobile 1 above the surface of the seat 4. By this means, the passenger can sit on the seat 4 in a posture in which the right and left arms are placed on the pair of right and left armrests 5, respectively. For example, during the automatic driving, even the passenger sitting on the driver's seat 4 can take the posture illustrated in FIGS. 4 to 6, as well as the passenger sitting on the seat 4 next to the driver' seat 4 and the passenger sitting on the back seat 4.

The armrest airbag device 20 is built in each of the pair of right and left armrests 5. The armrest airbag device 20 includes an airbag body 21 having an inflator, and an armrest airbag 22 configured to deploy from the airbag body 21. The airbag body 21 is built in the armrest 5. The armrest airbag 22 is built in the airbag body 21. The armrest airbags 22 are deployed inward from the inner surfaces of the armrests 5 in the right and left direction, along the upper portions of the thighs of the passenger sitting on the seat 4. The armrest airbags 22 deployed from the right and left sides contact and press down on the upper portions of the right and left thighs of the passenger sitting on the seat 4.

Moreover, as illustrated in FIG. 3, the armrest airbag device 20 includes a compressed air generator 23, an intake valve 24, and an exhaust valve 25. The compressed air generator 23 compresses the air in the automobile body 2 to generate high-pressure air. The intake valve 24 is provided in a flow passage between the compressed air generator 23 and the armrest airbag 22 through which the compressed air flows. When the intake valve 24 is opened, the compressed air is supplied to the armrest airbag 22. The armrest airbag 22 is expanded and deployed outward from the airbag body 21. The exhaust valve 25 is provided in a flow passage between the armrest airbag 22 and the outside air. When the exhaust valve 25 is opened, the compressed air is discharged from the armrest airbag 22. The armrest airbag 22 is shrunk. The shrunk armrest airbag 22 retracts into the airbag body 21. The armrest airbag 22 can be repeatedly expanded and shrunk by controlling the injection and discharge of the compressed air. In addition, the expanded armrest airbag 22 deploys inward from the armrest 5 toward the side of the upper body of the passenger sitting on the seat 4, The expanded armrest airbag 22 deploys along the side of the upper body of the passenger sitting on the seat 4 and reaches the underarm.

The controller 19 activates the seat belt device 14 and the armrest airbag devices 20 depending on behaviors of the automobile 1.

For example, during the manual driving by the driver or the automatic driving, the automobile 1 may sharply turn, suddenly start and suddenly stop. By this means, the upper body of the passenger sitting on the seat 4 is likely to be badly shaken. When predicting or detecting these behaviors, the controller 19 activates the pair of armrest airbag devices 20 at the time measured by the timer 13. Each of the armrest airbag devices 20 opens the intake valve 24 to inject the compressed air into the armrest airbag 22, so that the armrest airbag 22 is deployed. The armrest airbag 22 deploys upward along the side of the upper body of the passenger sitting on the seat 4. By this means, the right and left sides and the right and left underarm of the upper body of the passenger are supported by the armrest airbags 22, and therefore it is possible to prevent the upper body from being badly shaken.

Moreover, when predicting that the automobile 1 will be in a collision based on an image captured by the imaging sensor 11, the controller 19 activates the seat belt device 14 and the pair of armrest airbag devices 20 at the timing set by the timer 13. The seat belt device 14 performs a pretension operation to reel the seat belt 15 before the collision. The pair of armrest airbags 22 of the pair of the armrest airbag devices 20 is deployed by the injection of the compressed air, and supports the right and left sides and the right and left underarms of the upper body of the passenger. By this means, it is possible to prevent the passenger sitting on the seat 4 from greatly changing in the seating position, or from tilting, and therefore to hold the passenger in the seating position of the seat 4.

Then, if the controller 19 determines the collision of the automobile 1 based on, for example, the detection of the collision by the collision sensor 12, the controller 19 may additionally activate a front airbag device 16 to deploy the front airbag 18. In this case, the upper body of the passenger supported by the pair of armrest airbags 22 and the seat belt 15 bends forward and slumps against the front airbag 18 while the low back of the passenger is held in the seating position of the seat 4. Therefore, the front airbag 18 can receive and support the upper body slumping against the front airbag 18 in a desirable posture, and appropriately absorb the impact.

On the other hand, after the above-described behaviors of the automobile 1, or after avoiding a collision, the controller 19 activates the pair of armrest airbag devices 20 to retract the armrest airbags 22. To be more specific, the controller 19 opens the exhaust valves 25 to shrink the armrest airbags 22. The shrunk armrest airbags 22 are stored in the airbag bodies 21 of the armrests 5 again. By this means, the armrest airbags 22 can be deployed by the compressed air again. Here, the controller 19 may forcibly discharge the air from the armrest airbags 22.

As described above, with the present example, the armrest airbags 22, as movable members, are deployed from the armrests 5 on which the arms of the passenger sitting on the seat 4 can be placed, toward the sides of the upper body of the passenger, and are retracted into the armrests 5, depending on the behavior of the automobile 1. Therefore, not only when the automobile 1 is in a collision, but also when, for example, the automobile 1 sharply turns, it is possible to support the sides of the upper body of the passenger sitting on the seat 4 by the armrest airbags 22 to adjust the position or posture of the upper body, and to prevent the upper body from moving. Here, the armrest airbags 22 are slowly deployed not by high-pressure gas generated by the inflators, but by compression air. Therefore, even though the armrest airbags 22 are deployed inward to the sides of the upper body of the passenger sitting on the seat 4, it is possible to allow the armrest airbags 22 to adhere tightly to the sides of the upper body to support the upper body while preventing a strong force from being applied to the upper body.

With the present example, the expanded armrest airbags 22 are deployed upward along the sides of the upper body of the passenger sitting on the seat 4 and reaches the underarms. Moreover, the armrest airbags 22 are deployed inward from the armrests 5 while the elbows of the passenger sitting on the seat 4 are placed on the armrests 5, and therefore the armrest airbags 22 can be appropriately deployed along the sides of the upper body to reach the underarms. By this means, it is possible to support the passenger at the underarms, and therefore to prevent the upper body of the passenger from being shaken.

Example 2

Next, the passenger protection apparatus 10 for the automobile 1 according to Example 2 of the present invention will be described. Hereinafter, the same components as those in Example 1 are assigned the same reference numerals, and repetitive description will be omitted. In addition, differences from Example 1 will be mainly described.

Figure 7A:
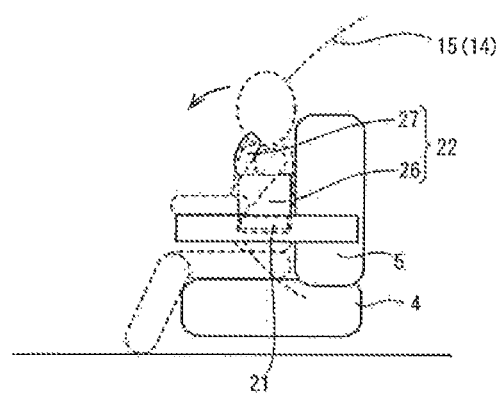
FIG. 7A is a side view illustrating deployment of an armrest airbag according to Example 2.
Figure 7B:
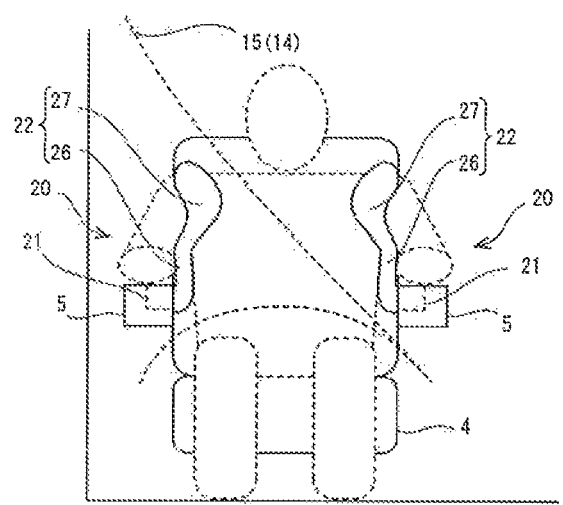
FIG. 7B is a front view illustrating deployment of armrest airbags according to Example 2.

FIGS. 7A and 7B illustrate the deployment of the armrest airbags 22 of the armrest airbag devices 20 according to Example 2. FIG. 7A is a side view, and FIG. 7B is a front view. Each of the armrest airbags 22 illustrated in FIGS. 7A and 7B includes side supporting section 26 configured to deploy upward along the side of the upper body of the passenger sitting on the seat 4, and an extension section 27 configured to further deploy upward from the side supporting section 26. The extension section 27 is deployed forward from the upper end of the side supporting section 26, and bends to reach the front portion and the upper portion of the shoulder.

As described above, with the present example, the expanded armrest airbags 22 are deployed upward along the sides of the upper body of the passenger sitting on the seat 4 and reach the front portions and the upper portions of the shoulders. Moreover, the armrest airbags 22 are deployed inward from the armrests 5 while the elbows of the passenger sitting on the seat 4 are placed on the armrests 5. Therefore, the armrest airbags 22 can be appropriately deployed to reach the underarms, and further deployed from the underarms to the front portions and the upper portions of the shoulders. The armrest airbags 22 deployed from the underarms to the front portions and the upper portions of the shoulders can effectively prevent the upper body from being shaken from side to side and from bending forward.

Example 3

Next, the passenger protection apparatus 10 for the automobile 1 according to Example 3 of the present invention will be described. Hereinafter, the same components as those in Example 1 are assigned the same reference numerals, and repetitive description will be omitted. In addition, differences from Example 1 will be mainly described.

Figure 8:
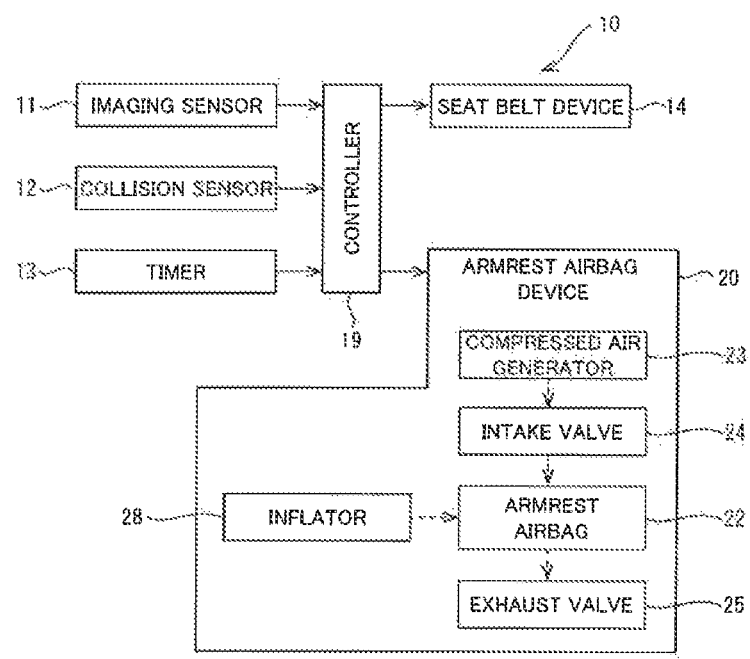
FIG. 8 is a block diagram illustrating the passenger protection apparatus according to Example 3.

FIG. 8 is a block diagram illustrating the passenger protection apparatus 10 according to Example 3. In FIG. 8, the armrest airbag device 20 includes an inflator 28. The inflator 28 supplies the armrest airbag 22 with high-pressure gas generated by igniting the inflator 28.

When predicting that the automobile 1 will take an unusual behavior or be in a collision, the controller 19 deploys the armrest airbags 22 by the injection of the compressed air. By this means, the armrest airbags 22 can support the sides of the upper body. In addition, when detecting the automobile 1 being in a collision, the controller 19 ignites the inflators 28. By this means, the high pressure gas is additionally injected into the armrest airbags 22 deployed by the compressed air. The armrest airbags 22 are deployed with the inner pressure higher than when the armrest airbags 22 are deployed only by the compressed air, and therefore firmly support the upper body.

As described above, with the present example, when predicting that the automobile 1 will take an unusual behavior or be in a collision, for example, during the automatic driving, the controller 19 deploys the armrest airbags 22 by the injection of the compressed air. In addition, when detecting the automobile 1 being in a collision, the controller 19 additionally injects the high-pressure as generated by the inflators 28 into the armrest airbags 22 to increase the inner pressure of the armrest airbags 22. Therefore, when the automobile 1 is in a collision, it is possible to prevent the upper body of the passenger sitting on the seat 4 from changing in the adjusted position or posture by the armrest airbags 22 appropriately deployed along the sides of the upper body.

Example 4

Figure 9:
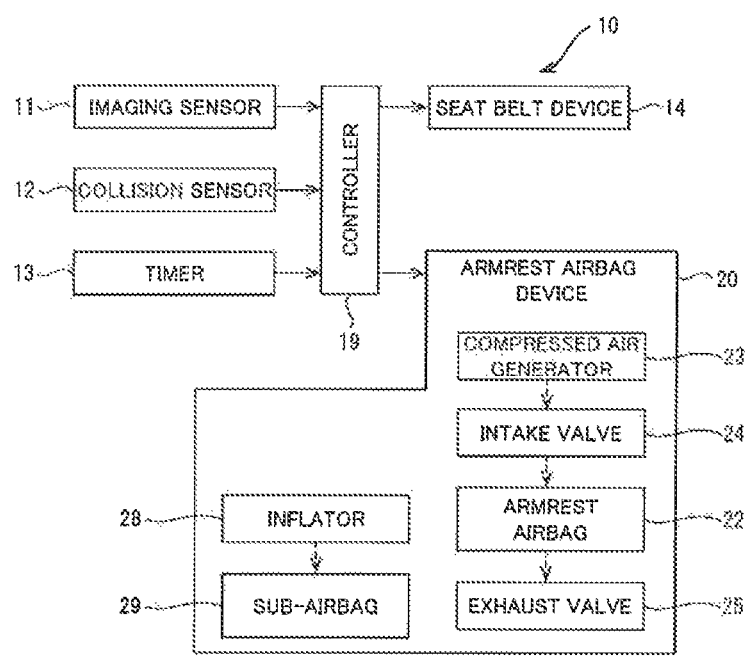
FIG. 9 is a block diagram illustrating the passenger protection apparatus according to Example 4.

Next, the passenger protection apparatus 10 for the automobile 1 according to Example 4 will be described. Hereinafter, the same components as those in Example 3 are assigned the same reference numerals, and repetitive description will be omitted. In addition, differences from Example 3 will be mainly described, FIG. 9 is a block diagram illustrating the passenger protection apparatus 10 according to Example 4. In FIG. 9 the armrest airbag device 20 includes a sub-airbag 29 in addition to the inflator 28. The inflator 28 supplies the sub-airbag 29 with high-pressure gas generated by igniting the inflator 28.

Figure 10A:
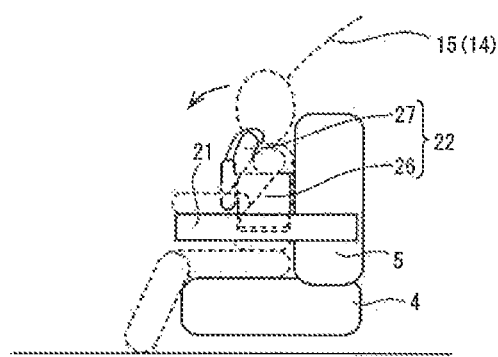
FIG. 10A is a side view illustrating deployment of the armrest airbag and a sub-airbag according to Example 4.
Figure 10B:
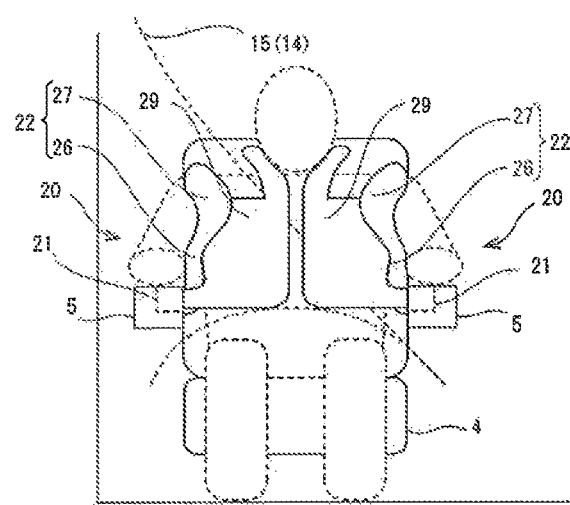
FIG. 10B is a front view illustrating deployment of the armrest airbags and sub-airbags according to Example 4.

FIGS. 10A and 10B illustrate the deployment of the armrest airbags 22 and the sub-airbags 29 according to Example 4. FIG. 10A is a side view, and FIG. 10B is a front view. Each of the armrest airbags 22 illustrated in FIGS. 10A and 10B includes the side supporting section 26 configured to deploy upward along the side of the upper body of the passenger sitting on the seat 4, and the extension section 27 configured to further deploy upward from the side supporting section 26 to reach the front portion and the upper portion of the shoulder. The sub-airbag 29 and the armrest airbag 22 are formed as one piece. The sub-airbag 29 is deployed from the armrest airbag 22 deployed along the side of the upper body of the passenger sitting on the seat 4, toward the front face of the upper body and the circumference of the head of the passenger.

When predicting that the automobile 1 will take an unusual behavior or be in a collision, the controller 19 deploys the armrest airbags 22 by the injection of the compressed air. In addition, when detecting the automobile 1 being in a collision, the controller 19 injects the high-pressure gas generated by the inflators 28 into the sub-airbags 29 to deploy the sub-airbags 29 from the deployed armrest airbags 22.

By this means, when the automobile 1 is in a collision, the armrest airbags 22 and the sub-airbags 29 are deployed not only to the sides of the upper body of the passenger sitting on the seat 4, but also to the front face of the upper body, and therefore it is possible to prevent the upper body from moving. Moreover, the sub-airbags 29 are also deployed to the circumference of the head, and therefore it is possible to prevent the head from being tilted or turned with respect to the upper body. By deploying the airbags to surround the upper body and the circumference of the head of the passenger, it is possible to effectively prevent the upper body and the head of the passenger from being shaken.

While the above-described examples are preferred examples of the present invention, it is to be understood that the invention is not limited to these examples. The present invention is intended to cover various modification and alteration without departing from the spirit and scope of the present invention.

With the above-described examples, the airbags such as the armrest airbags 22 and the sub-airbags 29 are deployed from the armrests 5. In addition to this, for example, the inside back ends of the armrests 5 may be separated, and the controller 19 may move the inside back ends to the sides of the upper body of the passenger.

The invention claimed is:

1. A passenger protection apparatus for a vehicle, comprising
a first armrest disposed in a right side portion on an outside of a seat in a vehicle width direction;
a second armrest disposed in a left side portion on an outside of the seat in the vehicle width direction;
a first armrest airbag installed in the first armrest, and configured to inflate and deploy, into a first shape, from a side of the first armrest that faces the second armrest upward along a backrest of the seat, the first shape being an L-shape that extends from the side facing the second armrest toward the second armrest and extends upward of the vehicle;
a second armrest airbag installed in the second armrest, and configured to inflate and deploy, into a second shape, from a side of the second armrest that faces the first armrest upward along the backrest of the seat, the second shape being an L-shape that extends from the side facing the first armrest toward the first armrest and extends upward of the vehicle;
a controller configured to inflate and deploy the first and second armrest airbags in accordance with a behavior of the vehicle; and
wherein the pair of the first and second armrest airbags is configured to be deployed to locations suited for holding a passenger by supporting right and left respective underarms of the upper body of the passenger when the passenger is sitting on the seat.

2. The passenger protection apparatus for a vehicle according to claim 1, wherein the first and second armrest airbags are capable of repeatedly expanding and shrinking by controlling injection and discharge of compressed air by the controller.

3. The passenger protection apparatus for a vehicle according to claim 2, wherein the expanded armrest airbags each deploy, in addition to locations for supporting the right and left respective underarms of the upper body of the passenger, upward along a region designed to reach at least an anticipated passenger front portion location or an anticipated passenger upper portion of a shoulder location.

4. The passenger protection apparatus for a vehicle according to claim 3, wherein: when a large behavior of the vehicle or a collision of the vehicle is predicted by the controller, the controller causes compressed air to be injected to the armrest airbags to deploy the armrest airbags; and when a collision of the vehicle is detected by the controller, the controller causes high-pressure gas generated by an inflator to be additionally injected into the armrest airbags to increase inner pressure of the armrest airbags.

5. The passenger protection apparatus for a vehicle according to claim 3, further comprising first and second sub-airbags capable of deploying, respectively, from the first and second armrest airbags, which sub-air bags are deployed upward along a region where there is anticipated to be positioned a side of the upper body of the passenger when sitting on the seat, toward an anticipated location of a passenger front face of the upper body or toward an anticipated location of a circumference of a head of the passenger, wherein:
  when a large behavior of the vehicle or a collision of the vehicle is predicted by the controller, the controller causes compressed air to be injected to the armrest airbags to deploy the armrest airbags; and
  when a collision of the vehicle is detected by the controller, the controller causes high-pressure gas generated by an inflator to be injected into the sub-airbags to deploy the sub-air bags from the deployed armrest airbag.

6. The passenger protection apparatus for a vehicle according to claim 4, further comprising first and second sub-airbag capable of deploying, respectively, from the first and second armrest airbags, which sub-air bags are deployed upward along a region where there is anticipated to be positioned a side of the upper body of the passenger when sitting on the seat, toward an anticipated location of a passenger front face of the upper body or toward an anticipated location of a circumference of a head of the passenger, wherein:
  when a large behavior of the vehicle or a collision of the vehicle is predicted by the controller, the controller causes compressed air to be injected to the armrest airbags to deploy the armrest airbags; and
  when a collision of the vehicle is detected by the controller, the controller causes high-pressure gas generated by an inflator to be injected into the sub-airbags to deploy, respectively, the sub-air bags from the deployed armrest airbags.

7. The passenger protection apparatus for a vehicle according to claim 2, wherein: when a large behavior of the vehicle or a collision of the vehicle is predicted by the controller, the controller causes compressed air to be injected to the armrest airbags to deploy the armrest airbags; and when a collision of the vehicle is detected by the controller, the controller causes high-pressure gas generated by an inflator to be additionally injected into the armrest airbags to increase inner pressure of the armrest airbags.

8. The passenger protection apparatus for a vehicle according to claim 7, further comprising first and second sub-airbags capable of deploying, respectively, from the first and second armrest airbags, which sub-air bags are deployed upward along a region where there is anticipated to be positioned a side of the upper body of the passenger when sitting on the seat, toward an anticipated location of a passenger front face of the upper body or toward an anticipated location of a circumference of a head of the passenger, wherein:
  when a large behavior of the vehicle or a collision of the vehicle is predicted by the controller, the controller causes compressed air to be injected to the armrest airbags to deploy the armrest airbags; and
  when a collision of the vehicle is detected by the controller, the controller causes high-pressure gas generated by an inflator to be injected into the sub-airbags to deploy, respectively, the sub-air bags from the deployed armrest airbags.

9. The passenger protection apparatus for a vehicle according to claim 2, further comprising first and second sub-airbags capable of deploying, respectively, from the first and second armrest airbags, which sub-air bags are deployed upward along a region where there is anticipated to be positioned a side of the upper body of the passenger when sitting on the seat, toward an anticipated location of a passenger front face of the upper body or toward an anticipated location of a circumference of a head of the passenger, wherein:
  when a large behavior of the vehicle or a collision of the vehicle is predicted by the controller, the controller causes compressed air to be injected to the armrest airbags to deploy the armrest airbags; and
  when a collision of the vehicle is detected by the controller, the controller causes high-pressure gas generated by an inflator to be injected into the sub-airbags to deploy the sub-air bags from respective, deployed armrest airbags.

10. The passenger protection apparatus for a vehicle according to claim 1, wherein: when a large behavior of the vehicle or a collision of the vehicle is predicted by the controller, the controller causes compressed air to be injected to the armrest airbags to deploy the armrest airbags; and when a collision of the vehicle is detected by the controller, the controller causes high-pressure gas generated by an inflator to be additionally injected into the armrest airbags to increase inner pressure of the armrest airbags.

11. The passenger protection apparatus for a vehicle according to claim 10, further comprising first and second sub-airbags capable of deploying, respectively, from the first and second armrest airbags, which sub-air bags are deployed upward along a region where there is anticipated to be positioned a side of the upper body of the passenger when sitting on the seat, toward an anticipated location of a passenger front face of the upper body or toward an anticipated location of a circumference of a head of the passenger, wherein:
  when a large behavior of the vehicle or a collision of the vehicle is predicted by the controller, the controller causes compressed air to be injected to the armrest airbags to deploy the armrest airbags; and
  when a collision of the vehicle is detected by the controller, the controller causes high-pressure gas generated by an inflator to be injected into the sub-airbags to deploy, respectively, the sub-air bags from the deployed armrest airbags.

12. The passenger protection apparatus for a vehicle according to claim 1, wherein the first and second airbags are each in fluid communication with a compressed air generator and an ignition inflator.

13. The passenger protection apparatus for a vehicle according to claim 12, wherein the controller initiates a compressed air supply to the first and second airbags either as a sole source of airbag fluid communication, or sets, in sequence, an initial compressed air supply then an ignition inflator sourced gas supply to further inflate the first and second airbags.

14. The passenger protection apparatus for a vehicle according to claim 12, wherein the controller is configured to utilize the compressed air generator as the only fluid source supply during a sensed potential excessive passenger movement under a non-collision scenario.

15. The passenger protection apparatus for a vehicle according to claim 12, wherein the controller is configured to utilize both the compressed air generator and the ignition inflator upon sensing a collision or anticipated collision scenario.

16. The passenger protection apparatus for a vehicle according to claim 1, further comprising:
  a compressed air generator system configured to compress air to generate compressed air, wherein the first armrest airbag is installed in the first armrest in a first size, is configured to be expanded from the first size to a second size larger than the first size by supplying the compressed air to the first armrest airbag via an intake valve coupled with the compressed air generator system, and is configured to be shrunk from the second size to the first size by discharging the compressed air from the first armrest airbag via an exhaust valve, the second armrest airbag is installed in the second armrest in a storage size, is also configured to be expanded from the storage size to a deployed size larger than the storage size by supplying the compressed air to the second armrest airbag via an intake valve coupled with the compressed air generator system, and is configured to be shrunk from the deployed size to the storage size by discharging the compressed air from the second armrest airbag via an exhaust valve, and the controller is configured to:
deploy, from the first armrest, the first armrest airbag in accordance with a behavior of the vehicle and retract, into the first armrest, the first armrest airbag in accordance with a behavior of the vehicle, and deploy, from the second armrest, the second armrest airbag in accordance with a behavior of the vehicle and retract, into the second armrest, the second armrest airbag in accordance with a behavior of the vehicle, and wherein the pair of the first and second armrest air bags is deployed to hold a passenger sitting on the seat by supporting a right and left underarm of the upper body of the passenger in preparation for a sudden change in the behavior of the vehicle.

17. The passenger protection apparatus for a vehicle according to claim 1, wherein
the controller is configured to:
deploy the first and second armrest airbags by supplying, via an intake valve, compressed air to the first and second armrest airbags when the controller predicts the sudden change in the behavior of the vehicle to hold a passenger sitting on the seat by supporting a right and left underarm of the upper body of the passenger, and retract the first and second armrest airbags into, respectively, the first and second armrests by discharging the compressed air in the first and second armrest airbags via an exhaust valve after the sudden change in vehicle behavior.

18. A passenger protection apparatus according to claim 1 wherein each of the first and second armrest airbags, when in a final state of expansion, are positioned only above a lowermost end of the respective first and second armrests.

19. A passenger protection apparatus for a vehicle, comprising
a first armrest disposed in a right side portion on an outside of a seat in a vehicle width direction;
a second armrest disposed in a left side portion on an outside of the seat in the vehicle width direction;
a first armrest airbag installed in the first armrest, and configured to inflate and deploy from an inside of the first armrest along an initial deployment axis that is positioned to extend between anticipated front and rear surface portions of the passenger such that the first armrest airbag is configured to contact a right side of the passenger and then extend upward along an inside of the right side arm as to reach a right side underarm of the passenger on the seat;
a second armrest airbag installed in the second armrest, and configured to inflate and deploy from an inside of the second armrest along the initial deployment axis such that the second armrest airbag is configured to contact a left side of the passenger and then extend upward in a manner designed to reach a left side underarm of the passenger on the seat;
a controller configured to inflate and deploy the first and second armrest airbags in accordance with a behavior of the vehicle.

20. A passenger protection apparatus according to claim 19 wherein each of the first and second armrest airbags, when in a final state of expansion, are positioned only above a lowermost end of the respective first and second armrests.

* * * * *